US006925598B2

(12) United States Patent
Melhem et al.

(10) Patent No.: US 6,925,598 B2
(45) Date of Patent: Aug. 2, 2005

(54) CUSTOMIZATION OF OBJECT PROPERTY LAYOUT FOR A USER INTERFACE

(75) Inventors: Wassim Melhem, Toronto (CA); Cecil L. Parsons, Richmond Hill (CA); Dirk A. Seelemann, Thornhill (CA); Therese Sroujian, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 10/105,140

(22) Filed: Mar. 21, 2002

(65) Prior Publication Data

US 2003/0063124 A1 Apr. 3, 2003

(30) Foreign Application Priority Data

Sep. 28, 2001 (CA) .............................................. 2357969

(51) Int. Cl.⁷ .............................................. G06F 13/00
(52) U.S. Cl. ...................................... 715/513; 715/760

(58) Field of Search ................................ 715/513, 760, 715/744, 512; 345/762, 763, 764, 765

(56) References Cited

U.S. PATENT DOCUMENTS 5,956,736 A * 9/1999 Hanson et al. ............... 715/513
6,549,199 B1 * 4/2003 Carter et al. ................ 345/418

* cited by examiner

*Primary Examiner*—Cao (Kevin) Nguyen
(74) *Attorney, Agent, or Firm*—David A. Mims, Jr.

(57) ABSTRACT

A process flow development tool is given a capability of determining the properties corresponding to a particular type of object and allowing a user to decide how and where the properties will be shown in a Properties dialog for individual objects of the particular type. The capability allows the tool to present a dialog that allows the user to customize, for the particular type of object, the layout for the properties in the Properties dialog. This layout may then be stored in an organizer object associated with the particular type of object.

10 Claims, 13 Drawing Sheets

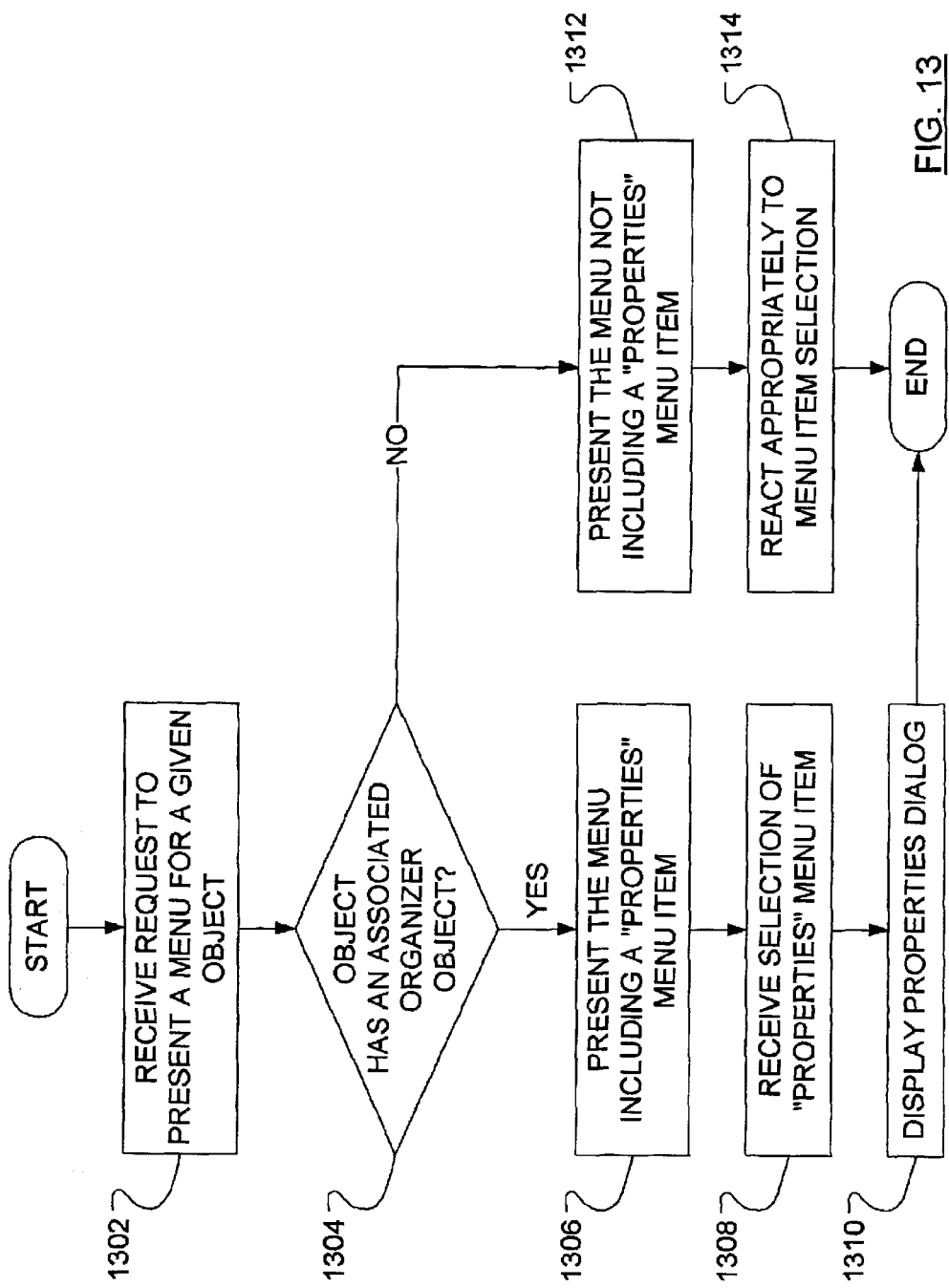

_(1)_

CUSTOMIZATION OF OBJECT PROPERTY LAYOUT FOR A USER INTERFACE

FIELD OF THE INVENTION

The present invention relates to software user interfaces and, in particular, to selection and/or layout of properties of an object for a user interface.

BACKGROUND OF THE INVENTION

It once was the case that a software program had a design that was determined solely by the original developer of the software. Over the last number of years, software has become increasingly modular, especially in view of object oriented programming. Object oriented programming has provided for the reuse of objects that are essentially parts of a whole. Once coded, a given object, with built-in properties and methods, may be imported into any number of different programs. One particular benefit of this is that a large object, designed to provide specific functionality, can be coded once but include a wide variety of possible implementations.

In the realm of software user interfaces, it is typical that a developer, to make use of an object, writes code to select those properties that are to be displayed in a user interface and to specify a layout for the selected properties. Where the developer wishes to use a pre-existing object which defines a user interface, the developer can rearrange the code for the object to reflect a desired layout. However, when changes in the layout of a particular user interface are required, the code must be reedited to affect the necessary changes. Those changes could include addition of properties to a display, deletion of properties from the display or simply re-arranging the manner in which the properties are displayed. This process adds time to what is called "the development cycle", i.e., the time required to develop a program.

Consider the familiar "Preferences" dialog that may be seen by selecting a "Preferences" menu option in an "Edit" drop-down menu in the known web browser program Netscape™ Navigator™. The Preferences dialog provides a choice of pages of options that allow a user to customize the program to his or her liking. These pages have names like "Appearance", "Navigator", "Mail & Newsgroups", and "Advanced". On the "Navigator" page are presented a number of options that allow a user to: decide the nature of the page that is displayed when the program starts; specify a "Home" page; specify a time period after which a record of visited pages expires; and clear a location bar.

In the circumstance where an upgraded version of the Navigator™ program is being devised, it may be decided to move the location bar clearing option to a position just below the Home page specification option. Unfortunately, the source code of the program will require altering to provide such a minor cosmetic change.

SUMMARY OF THE INVENTION

To customize a user interface to display properties of a given type of object (i.e., a given class), respective identities of properties of the type of object are first determined. A user is then allowed to decide a manner in which each of the properties will be shown in a user interface dialog. Once the user has communicated information about the identity of the properties, of a given type of object, that are to be displayed and the manner in which each property will be displayed (i.e., the object property layout), this information may be stored in an organization object associated with the given type of object. Subsequently, when an instance of the given type of object is created, the stored organization object is associated with the instance so that when a Properties dialog is requested for the instance, the properties may be displayed according to the layout described in the associated organization object.

In accordance with an aspect of the present invention there is provided a method of providing, to a user, a capability to customize a property layout for objects of a given type of object. The method includes determining a set of properties of said given type of object, displaying said set of said properties in a user interface, receiving an indication, from said user, of a grouping of particular ones of said set of said properties and storing information describing said grouping in a property organizer object associated with said given type of object. In a further aspect of the present invention, there is provided a computer system for process flow development for carrying out the invention. In a still further aspect of the present invention, there is provided a software medium that permits a general purpose computer to carry out this method.

In accordance with another aspect of the present invention there is provided a method of customizing the display of properties of an object of a class. The method includes allowing a user to group selected properties of said class and storing said grouped selected properties in an organizer object in association with said class.

In accordance with a further aspect of the present invention there is provided a method for displaying an object. The method includes, during instantiation of said object from a class, determining whether an organizer object is associated with said class and, where said organizer object is associated with said class, displaying properties of said instantiated object as specified by said organizer object.

In accordance with an aspect of the present invention there is provided a method of providing, to a user, a properties user interface for a given object, where said properties user interface has a customized property layout. The method includes presenting a menu, to said user, including a properties menu item, receiving an indication, from said user, of a selection of said properties menu item and displaying a properties user interface with a layout specified by an associated property organizer object. In a still further aspect of the present invention, there is provided a software medium that permits a general purpose computer to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 13 illustrates steps of a properties dialog presentation method according to an embodiment of the present invention.

DETAILED DESCRIPTION

Figure 1:
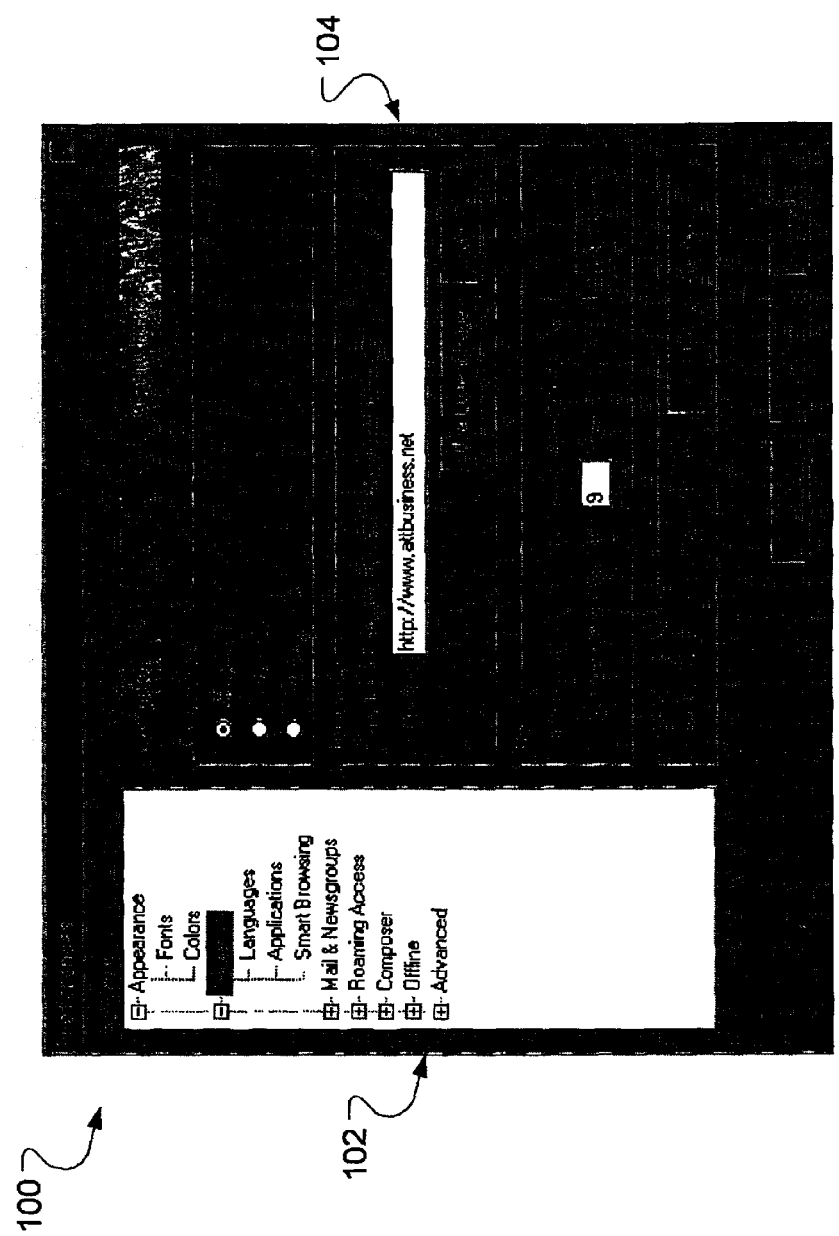
FIG. 1 illustrates a typical Preferences dialog.

FIG. 1 illustrates a typical Preferences dialog 100. The Preferences dialog 100 in particular, is a result of having selected a "Preferences" menu option in an "Edit" drop-down menu in Netscape™ Navigator™ version 4.7 by Netscape Communications Corporation of Mountain View, Calif. The Preferences dialog 100, which is a specific case of what may more broadly be called a Properties dialog, or Properties user interface, has a left pane 102 where pages corresponding to different categories of preferences may be selected. Once a page has been selected on the left pane 102, the page is displayed on a right pane 104. The right pane 104 may display properties such as text fields, text areas, check boxes, radio buttons, etc., as necessary.

While software, or anything else that requires a specific process flow to be laid out, is being developed, it is often helpful to employ tools to organize the flow. One such tool is Flow Composition Builder, which is a component of a universal tool platform marketed by IBM of Armonk, N.Y. Flow Composition Builder allows a user to create an object that is an instance of a "Flow Type", representative of an event or a software component, to a canvas, where the Flow Type object becomes a "node". Connections between these nodes may then be arranged in keeping with a desired process flow. A menu may be associated with each node so that particular actions may be taken by a user in respect of particular nodes, which are instances of specific Flow Types. As well, a menu may be associated with each Flow Type so that an action may be taken by a user in respect of all instances of the specific Flow Type. When the universal tool platform is initialized, a file is consulted to set up a development environment. For the purposes of the present discussion, this file can be referred to as "plugin.xml".

Notably, "Flow Type" is a term proprietary to the above-mentioned Flow Composition Builder. However, where such a tool is implemented with regard to Java program development, a "Flow Type" maps to a Java class. As is known, Java classes have "attributes", which may also be known as "fields" or "properties". In general, the term "properties" will be used herein.

Figure 11:
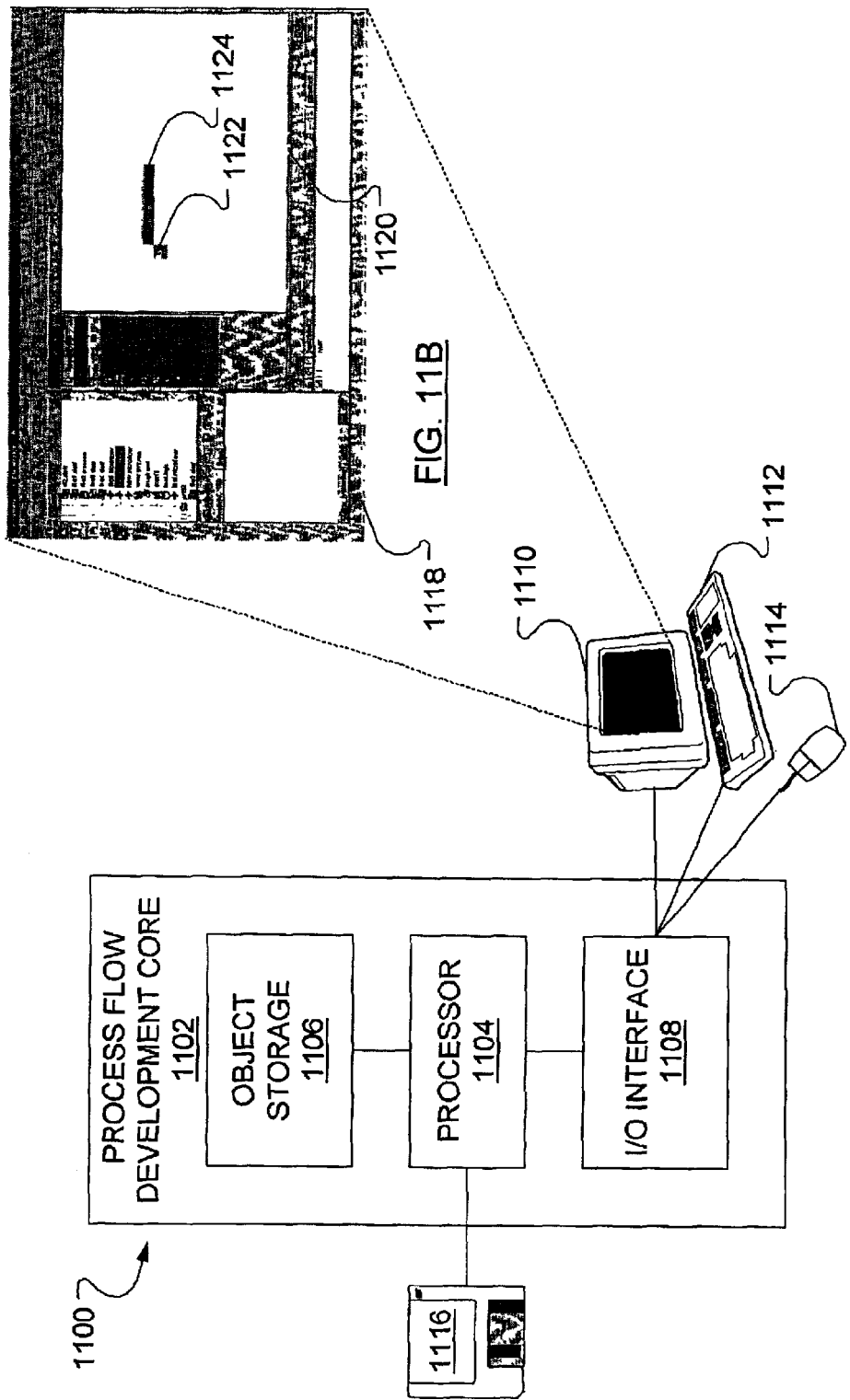
FIG. 11A illustrates a process flow development system according to an embodiment of the present invention.
FIG. 11B illustrates a layout of a window of a process flow development tool according to an embodiment of the present invention.

A rudimentary view of a process flow development system 1100 is illustrated in FIG. 11A. The process flow development system 1100 includes a process flow development core 1102, which may be, for instance, the CPU of a conventional personal computer. The process flow development core 1102 typically includes a processor 1104, a memory 1106 for object storage and an interface 1108 to input and output peripherals. Such peripherals may include a display monitor 1110, a keyboard 1112 and a mouse 1114. It should be clear that alternative peripheral devices exist. For instance, a trackball device may be used as a pointing device in place of the mouse 1114. The processor 1104 may be loaded with object property layout customization software for executing methods exemplary of this invention from a software medium 1116 which could be a disk, a tape, a chip or a random access memory containing a file downloaded from a remote source.

As illustrated in FIG. 11B, a process flow development tool may present a window-type user interface 1118 including a canvas 1120. In the canvas 1120 may be a node 1122 and a user may invoke a menu 1124 in respect of the node 1122, as shown.

In overview, a process flow development tool, which may perform methods exemplary of the present invention, is capable of determining the properties corresponding to a particular type of object (i.e., a Flow Type or class) and allowing a user to decide how and where the properties will be shown in a Properties dialog. The tool may present a dialog that allows the user to customize the object property layout. This layout may then be stored in an object called an Attribute Organizer. The Attribute Organizer object is stored in association with the type of object to which the Attribute Organizer object relates. Subsequently, when an instance of the given type of object is created, the stored organization object is associated with the instance so that when a Properties dialog is requested for the instance, the properties may be displayed according to the layout described in the associated organization object.

The Attribute Organizer object may take the form of a serialized file in Extensible Markup Language (xml) format that is stored physically along with the particular Flow Type whose property layout is being customized. One way of serializing xml is called the "xml Meta data Interchange" (XMI) format. The Attribute Organizer object can provide for a one-to-one relationship between instances of the particular Flow Type and the Properties dialog displayed in relation to the instances. Once a desired layout of the properties has been specified for a Flow Type object, a Properties dialog may display the properties of the Flow Type object in response to invocation of the Properties menu item on an instance of the Flow Type.

In operation, the user edits the plugin.xml file to add an "extension point". The extension point is used to specify the Flow Types that are to be available for a process flow layout session. An exemplary extension point follows.

```
<extension point="com.ibm.etools.fcb.propertiesHelper">
    <FCBPropertyEditor                              class=
        "com.ibm.etools.mq.workflow.properties.Program
        ExecutionFinder"/>
    <Type name="com.ibm.etools.
        mq.workflow.impl.PrograntActivityTypeSpecImpl"
        visible="true"/>
```

```
<Type name="com.ibm.etools.
    mq.workflow.impl.WFProcessSpecImpl" visible=
    "true"/>
<ResourceFile name="Workflow1"/>
</extension>
```

The above extension point specifies a property editor called "ProgramExecutionFinder", two Flow Types, named "ProgramActivityTypeSpecImpl" and "WFProcessSpecImpl" respectively, and a Resource file called "Workflow1".

As a result of the extension point, a "Properties" menu item is added to menus associated with nodes that are instances of Flow Types that are specified in the extension point. In a conventional manner, this addition of a menu item to a menu is performed at the time that the menu is invoked. Further, a "Customize Properties" menu item is provided in menus associated with Flow Types that are specified in the extension point.

Figure 2:
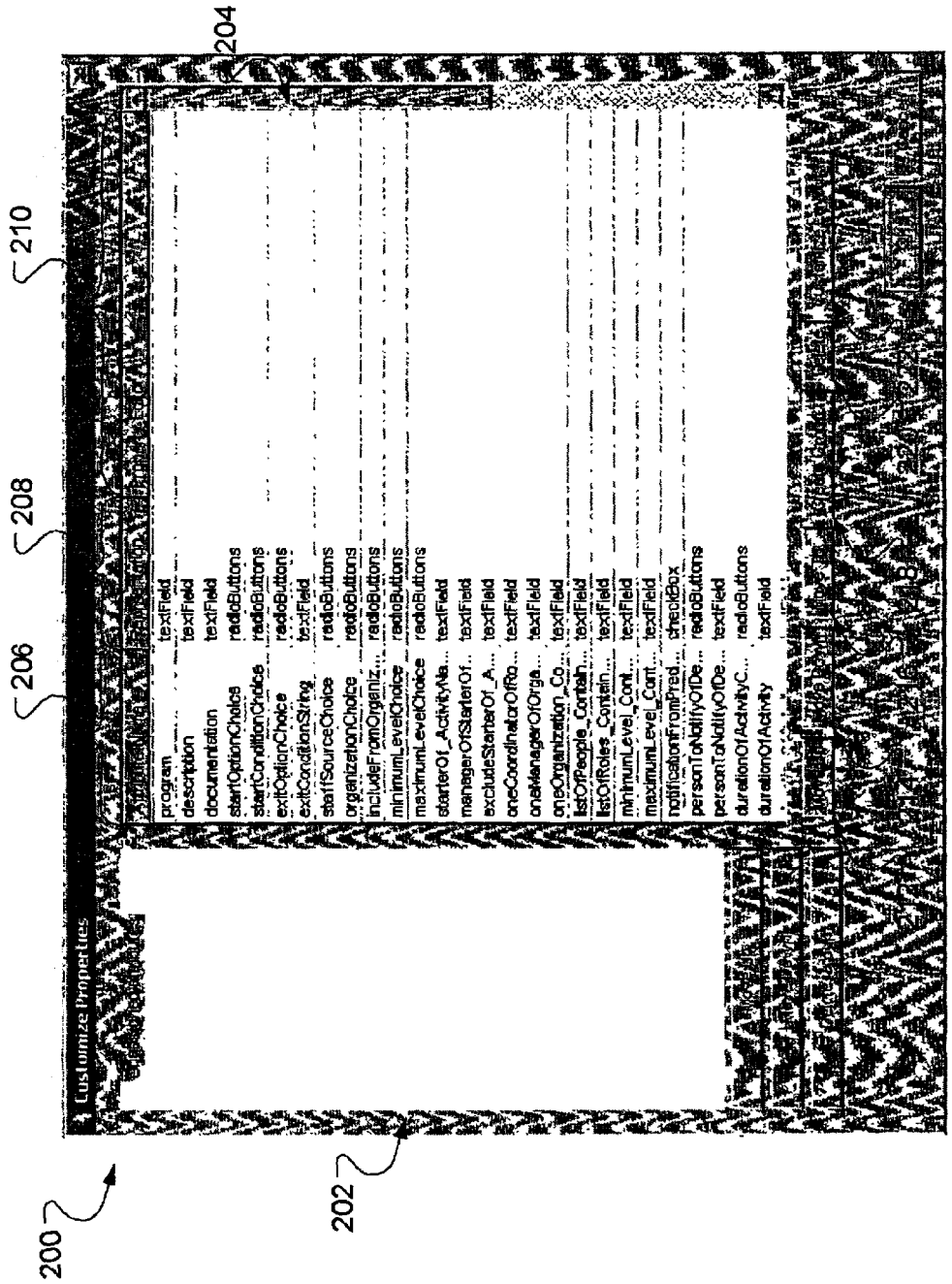
FIG. 2 illustrates a Customize Properties dialog, according to an embodiment of the present invention, for indicating identity and placement of properties of an object in a dialog such as is shown in FIG. 1.

An exemplary Customize Properties dialog 200, populated with properties (attributes) from an associated Flow Type, is illustrated in FIG. 2. The Customize Properties dialog 200 includes a left pane 202 and a right pane 204. In the right pane 204 are three columns, namely an Attribute Name column 206, a Representation column 208 and a Property Editor column 210. The Customize Properties dialog 200 also includes several buttons, in particular, a "Move Up" button 212, a "Move Down" button 214, a "Move To . . . " button 216, a "Create Group . . . " button 218, a "Delete" button 220 and a "Customize Layout . . . " button 222 may all be identified.

The value in the Attribute Name column 206, for a given row, is the XMI name of the property to which the given row corresponds. It will be seen in the following that attribute, property and field may be used interchangeably to refer to a component of an object. The property may be a static attribute, which may be, for instance, modeled using Rational Rose™, or a dynamic attribute. Dynamic attributes are not presently very common. However, it is expected that embodiments of the present invention should work with dynamic attributes once dynamic attributes are supported by the underlying tool platform. The XMI name may also be used as a key when referencing the Resource file specified in the extension point above.

The value in the Representation column 208, for the given row, is the default representation of the property and is dependent on the type of the property in the Attribute Name column 206. A mouse click in the Representation column 208 of a particular row can provide a user with a "combo box" or drop-down menu of choices for the representation of the associated property. The representation can then be changed by the user to one of a set of supported types listed in the combo box.

The Property Editor column 210 is optional. In use, when a cell in the Property Editor column 210 is selected, a list of choices is displayed. In one embodiment of the present invention, the choices listed are the names of classes implementing the available property editor interface, for example, the com.ibm.etools.fcb.properties.FCBPropertyEditor interface or the java.beans.PropertyEditor interface. In order for a name of a property editor interface to be displayed in the list of choices, the property editor is required to be specified in the plugin.xml file.

If a particular property editor interface is selected from the property editor list, the particular property editor may be used by a user to specify a representation for the corresponding property and the corresponding cell in the Representation column 208 will be ignored.

The information displayed in the Customize Properties dialog 200 may be saved in an Attribute Organizer object in a primitive file of the Flow Type to which the information relates. As will be apparent to a person skilled in the art, the primitive file of a given Flow Type is a file that uniquely relates to the given Flow Type. The information can then be used later to display the properties of any instance of the Flow Type. It may be that the Attribute Organizer object is also accessible from user interface dialogs other than the Customize Properties dialog 200. Such access to the Attribute Organizer object may be implemented using application programming interfaces (APIs) that may allow modification of some object property layouts or allow the addition or deletion of entries in the Attribute Organizer object.

The "Move Up" button 212 and the "Move Down" button 214 of the Customize Properties dialog 200 of FIG. 2 may be used to change the vertical order of presentation for the layout of the properties of a particular group of properties. In particular, the user would first select a property (other than the top property on the list) and click on the "Move Up" button 212. The selected property would then move up the vertical list and displace the property formerly immediately superior to the selected property to a position immediately inferior to the selected property.

The "Move To . . . " button 216 may be used to move a particular property from a first group to a second group. This button eliminates the need to delete the particular property from the first group and add it to the second group. Advantageously, some of the settings relating to the particular property (such as layout, Property Editor) will be moved with the particular property.

The "Create Group . . . " button 218 may be used to create a group of properties for displaying in a Properties dialog. As will be seen hereinafter, selecting the "Create Group . . . " button 218 may result in the user being presented with a Create Group Attributes dialog 300 (illustrated in FIG. 3).

The "Delete" button 220 may be used to remove a property from a particular group.

The "Customize Layout . . . " button 222 may be used to invoke a dialog to allow a user to customize the size, spacing and indentation of a selected property.

Throughout this invention description, dialogs are invoked for various purposes. Where an embodiment of the present invention is implemented in the Java™ programming language, it should be apparent to a person skilled in the art of Java Programming that extensive use of the Java Abstract Windowing Toolkit may be required. This toolkit provides the user interface features, such as buttons, check boxes and grouping of properties, seen in the dialogs described in conjunction with the following discussion of the figures that include exemplary dialogs.

The properties listed in the Customize Properties dialog 200 of FIG. 2 represent all the properties of a given Flow Type (i.e., class). The display of these properties may be customized for any given instance of this Flow Type by first selecting groups of properties, such that each group of properties will be displayed on the same (display) page. Thus, to customize the Properties dialog of an instance of the Flow Type having the attributes listed in the Customize Properties dialog 200 of FIG. 2, it is initially necessary to create a grouping of the properties that are to be displayed on a particular page. This grouping is achieved by first selecting the properties that are to be grouped on the particular page and then selecting the "Create Group . . . " button 218 on the Customize Properties dialog 200. As a result, the Create Group Attributes dialog 300 (illustrated in FIG. 3) may be displayed. The selection of the properties can be performed by the user through the use of such peripherals as the keyboard 1112 and the mouse 1114 (FIG. 11A).

As is conventional, a left mouse click while a cursor rests over a cell displaying a first property name may select that first property. A further left click, in conjunction with holding down a "Shift" key on the keyboard 1112, while the cursor rests over a cell displaying a second property name may select the second property, and all properties in the range between the first and second properties. An even further left click, in conjunction with holding down a "Ctrl" key on the keyboard 1112, while the cursor rests over a cell displaying a third property name may add the third property to those selected. However, unlike the above mentioned "Shift" key related left click, the "Ctrl" key related left click does not select the range of properties between the third property and the most recently selected property.

Figure 3:
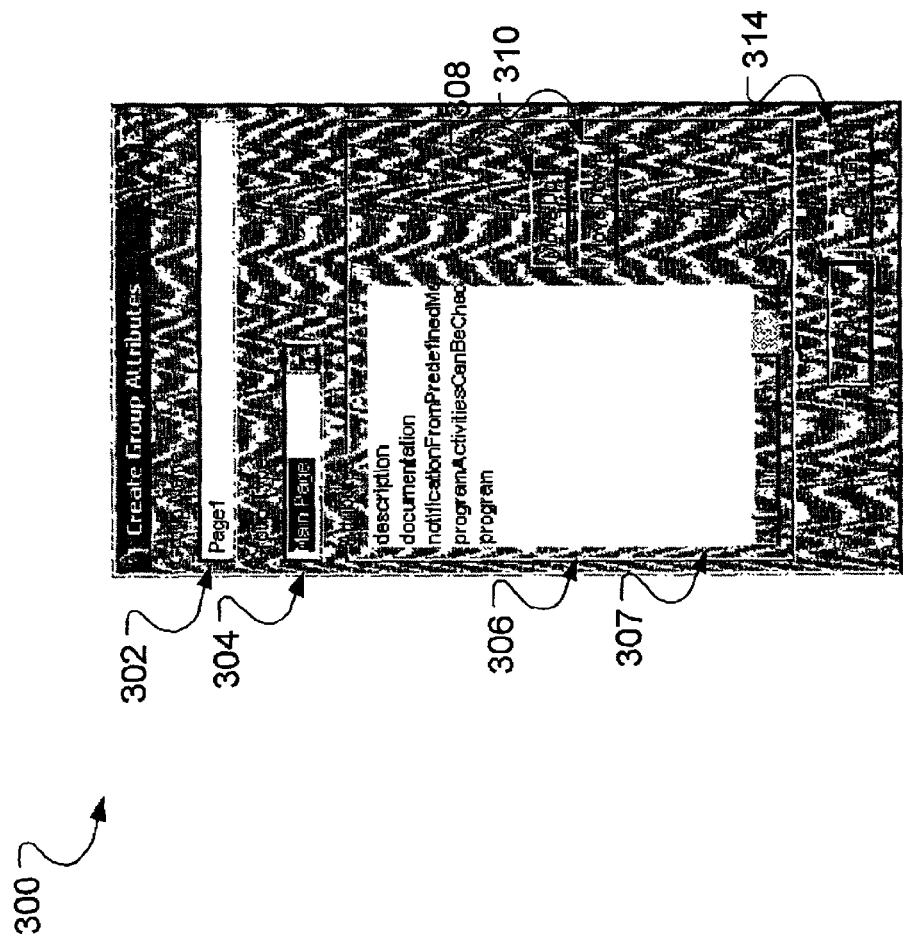
FIG. 3 illustrates a Create Group Attributes dialog, according to an embodiment of the present invention, arrived at by selecting a button on the Customize Properties dialog of FIG. 2.

The Create Group Attributes dialog 300, as shown in FIG. 3, includes a "Group Name" field 302 for receiving from the user a name for the group being created (which group will be displayed on the same page). Also included is a "Group Type" group box 304 that presents to the user a number of possibilities available for the type of the group being created. An Attributes group box 306 includes a properties text area 307, a "Move Up" button 308 and a "Move down" button 310. The properties text area 307 displays the names of the properties selected to be part of the group being created while the "Move Up" button 308 and the "Move down" button 310 allow the user to specify a vertical order for the properties. As is common with such dialogs, an "OK" button 312 and a "Cancel" button are also included.

As a result of a user clicking on the "OK" button 312 on the Create Group Attributes dialog 300, a group, whose name is "Page1" and whose type is "Main Page", may be added to the Attribute Organizer object associated with the Flow Type whose properties are listed in the Customize Properties dialog 200 of FIG. 2. Subsequently, the group "Page1" can be divided into other groupings such as Nested Pages, Group Boxes or Vertical or Horizontal groupings.

Figure 4:
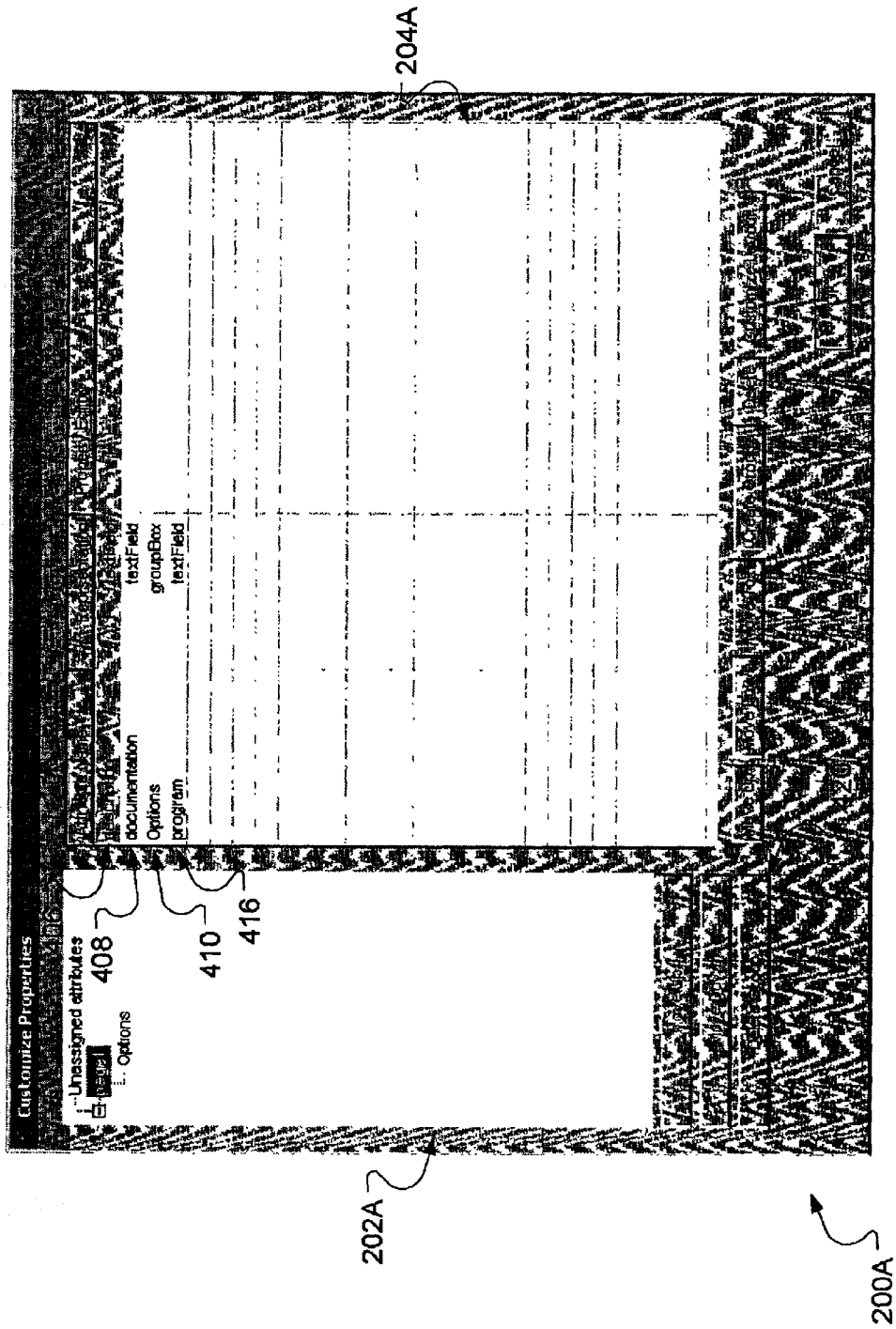
FIG. 4 illustrates the Customize Properties dialog of FIG. 2 after the creation of a group.

In FIG. 4, a Customize Properties dialog 200A has a left pane 202A and a right pane 204A. In the left pane 202A, the group, or page, "Page1" has been selected. Accordingly, the right pane 204A shows only those attributes in the group "Page1". The left pane 202A shows that a group box called "Options" has been created, as part of the group "Page1". As will become apparent hereinafter, the group box contains two check boxes. As can be seen in the right pane 204A, the attributes as listed from top to bottom include a "description" property 406 with a textField representation, a "documentation" property 408 with a textField representation, an "Options" property 410 with a groupBox representation and a "program" property 416 with a textField representation.

Notably, a "Delete Group" button 420 has become active in the Customize Properties dialog 200A, in a position below the left pane 202A. The "Delete Group" button 420 was not active in the Customize Properties dialog 200 of FIG. 2 as no groups yet existed. Two further buttons are grouped with the "Delete Group" button 420 for altering the order of display of a number of groups, or pages. As there is only a single group defined in the Customize Properties dialog 200A of FIG. 4, these buttons remain inactive.

It should be clear that further groups, or pages, may be added to the left pane 202A through the use of the "Create Group . . . " button 218 on the Customize Properties dialog 200. Once the number of pages number more than one, the use of the "Move To . . . " button 216 should become more apparent. While viewing the properties of a first page on the Customize Properties dialog 200, the user may select a given first page property. The user may then use the mouse to select the "Move To . . . " button 216. In response, the user will be given an opportunity to specify a second page to which of the more than one pages the selected property should be moved. Once the second page has been selected, the property is removed from the first page and added to the second page.

To invoke the Properties dialog, i.e., to view the property layout, of an instance of a given Flow Type, the user does not have to compose additional code. As is typical, an interaction between the user and a node 1122 on the canvas 1120 (FIG. 11B), say a right mouse click, can provide the user with a menu. When a menu corresponding to the node 1122 is invoked, the node 1122 may be examined to determine whether the Flow Type, of which the node 1122 is an instance, has an Attribute Organizer object declared in the plugin.xml file. If the Flow Type does have a declared Attribute Organizer object, a "Properties" menu item will be included in the menu that is provided responsive to the action of the user. The action corresponding to selecting the "Properties" menu item may be the presentation, by the tool, of a "Properties" dialog that lists the customized pages of the Flow Type object and shows the contents of a selected one of those customized pages.

Figure 5:
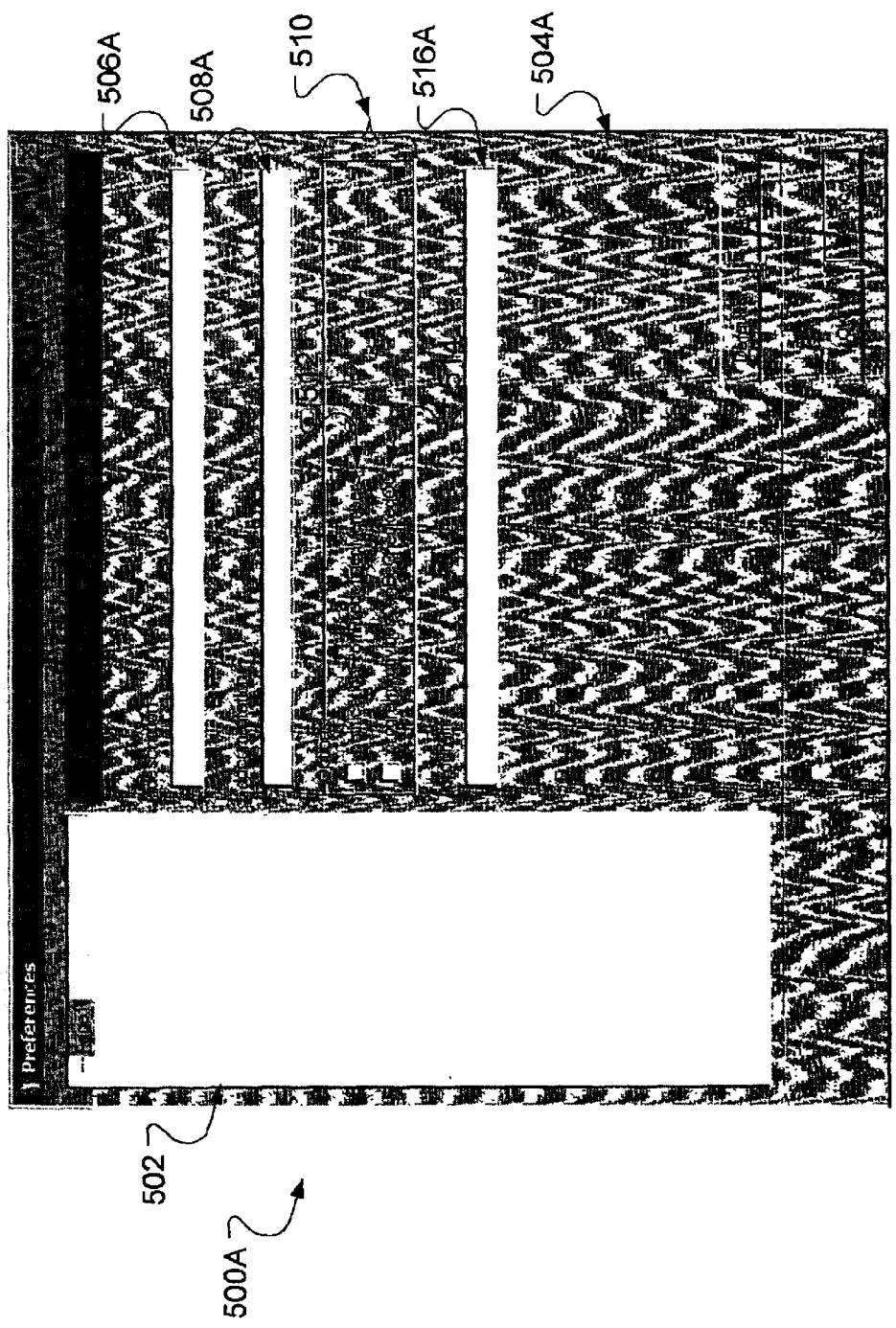
FIG. 5 illustrates a Properties dialog, according to an embodiment of the present invention, based on the object property layout in the Customize Properties dialog of FIG. 4.

A Properties dialog 500A, illustrated in FIG. 5, is a viewer for the edited properties of FIG. 4. Selected on a left properties pane 502 is the group "Page1". While on a right preferences pane 504A is shown an object property layout arranged according to the layout specified in the Customize Properties dialog 200A of FIG. 4. In particular, a "description" text field 506A is shown, corresponding to the "description" property 406 of FIG. 4. A "documentation" text field 508A is shown, corresponding to the "documentation" property 408. An "Options" group box 510 is shown, corresponding to the "Options" property 410. Further, a "program" text field 516A is shown, corresponding to the "program" property 416. Notably, the "Options" group box 510 includes a "notificationFromPredefinedMembers" check box 512 and a "programActivitiesCanBeCheckedOut" check box 514.

Figure 6:
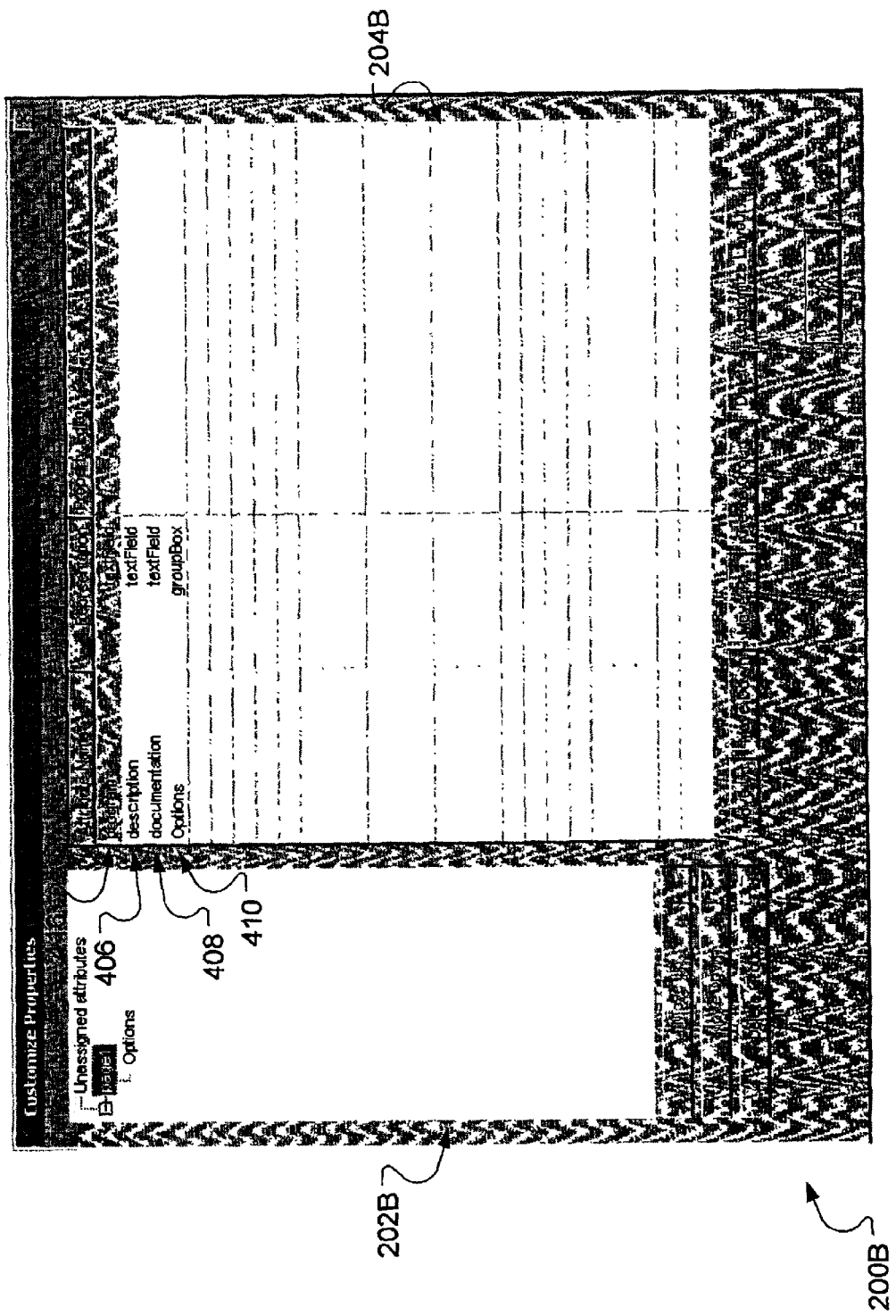
FIG. 6 illustrates the Customize Properties dialog of FIG. 4 after a customization of the object property layout.

In FIG. 6, a Customize Properties dialog 200B has a left pane 202B and a right pane 204B. In the left pane 202B, the group "Page1" has been selected. The right pane 204B shows that the layout of the object properties of the group "Page1" has been altered (customized). In particular, the representation of the "description" property 406 and the "documentation" property 408 has been changed from texField to textArea and the "program" property 416 has been moved from the bottom of the list to the top of the list.

Figure 7:
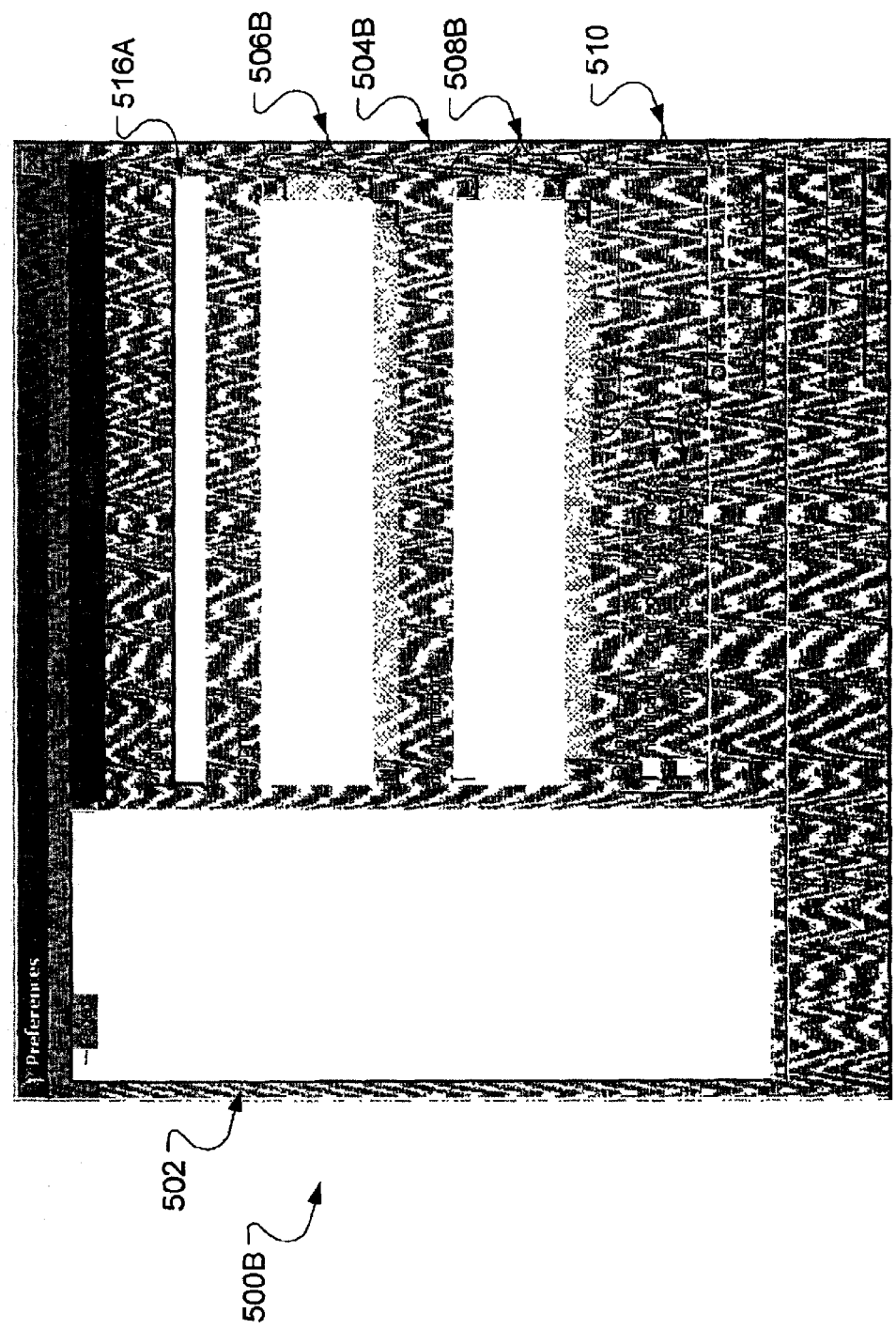
FIG. 7 illustrates a Properties dialog based on the object property layout in the Customize Properties dialog of FIG. 6.

A Properties dialog 500B is illustrated in FIG. 7. Selected on a left properties pane 502 is the group "Page1". While on a right properties pane 504B is shown a user interface layout arranged according to the object property layout specified in the Customize Properties dialog 200B of FIG. 6. In the order specified in FIG. 6, the "program" text field 516A is shown at the top of the layout. Next, a "description" text area 506B is shown. A "documentation" text area 508A is then shown. Finally, the "Options" group box 510 is shown.

Based on the above layout, the serialized Attribute Organizer object will include the following information:

<Fcm:AttributeOrganizer xmi:id="AttributeOrganizer_1" eDecorates="FlowType_1">

. . .

<groups xmi:id="AttributeGroup_1" layoutType="mainPage">

<children xsi:type="Fcm:AttributeDescriptor" represenation="textField" XMIName="program" XMIType="10"/>

```
<children xsi:type="Fcm:AttributeDescriptor"
    represenation="textArea" XMIName="description"
    XMIType="10"/>
<children xsi:type="Fcm:AttributeDescriptor"
    represenation="textArea" XMIName=
    "documentation" XMIType="10"/>
<children xsi:type="Fcm:AttributeGroup"
    layoutType="groupBox">
<children xsi:type="Fcm:AttributeDescriptor"
    represenation="checkBox" XMIName=
    "notificationFromPredefinedMembers" XMIType=
    "11"/>
<children xsi:type="Fcm:AttributeDescriptor"
    represenation="checkBox" XMIName=
    "programActivitiesCanBeCheckedOut" XMIType=
    "11""/>
</children>
</groups>
```

The Size, Spacing, Alignment and Indentation of the properties can also be changed through use of the Customize Properties dialog 200 (seen in FIG. 2), specifically via the Customize Layout . . . button 222, thereby giving more than typical layout control and flexibility to the properties dialog designer, i.e., the user of the tool.

Figure 8:
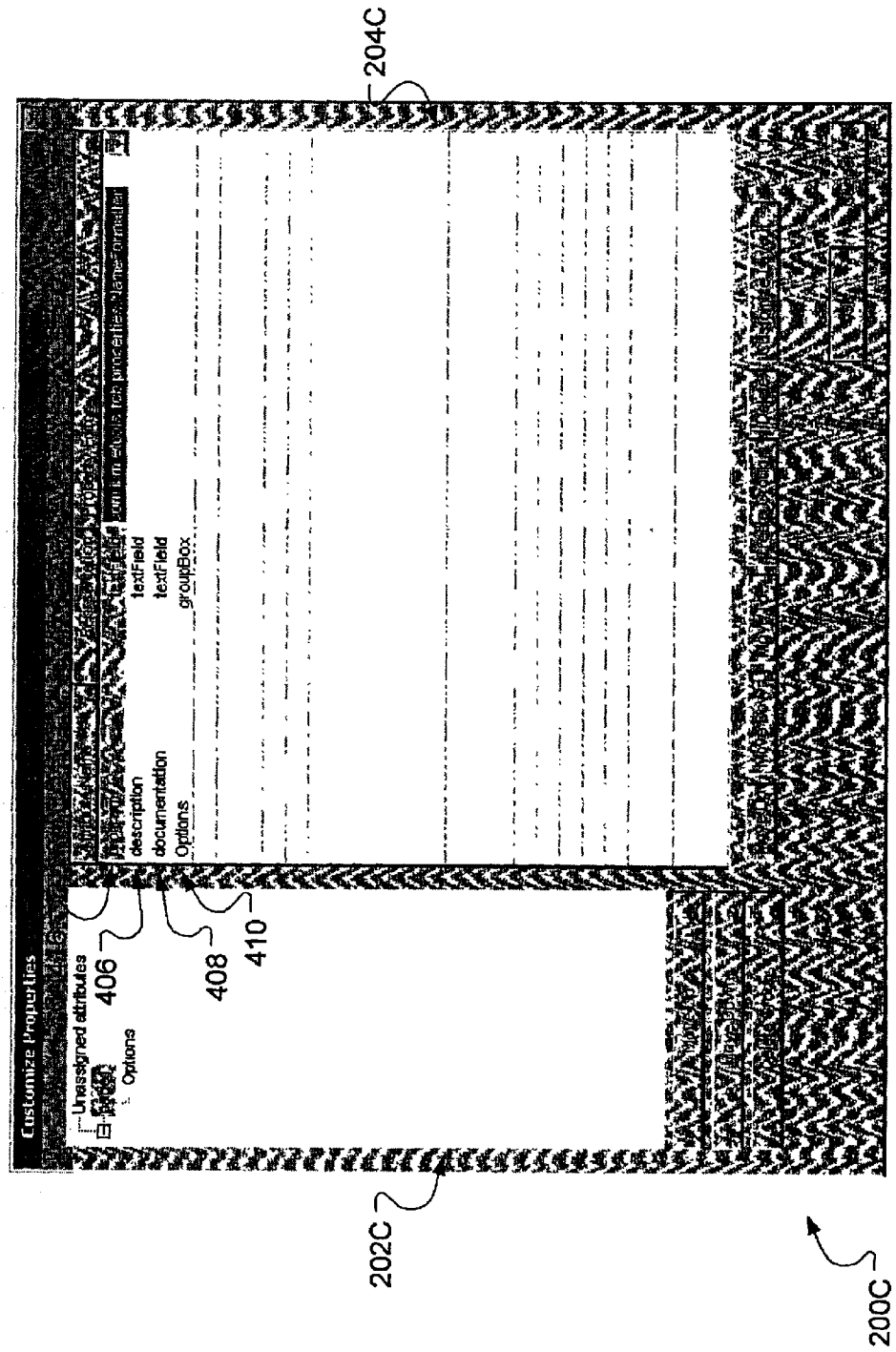
FIG. 8 illustrates the Customize Properties dialog of FIG. 6 after further customization of the object property layout.

To increase control over the representation of a property, the Property Editor column 210 can be used. As an example, a class may be supplied that extends a class FCBPropertyEditor, which is a default property editor that is included with Flow Control Builder, and is called NameFormatter. Furthermore, the class called NameFormatter may be assigned as a property editor for the "program" property 416. A Customize Layout dialog 200C is illustrated in FIG. 8 where this assignment has been made.

Figure 9:
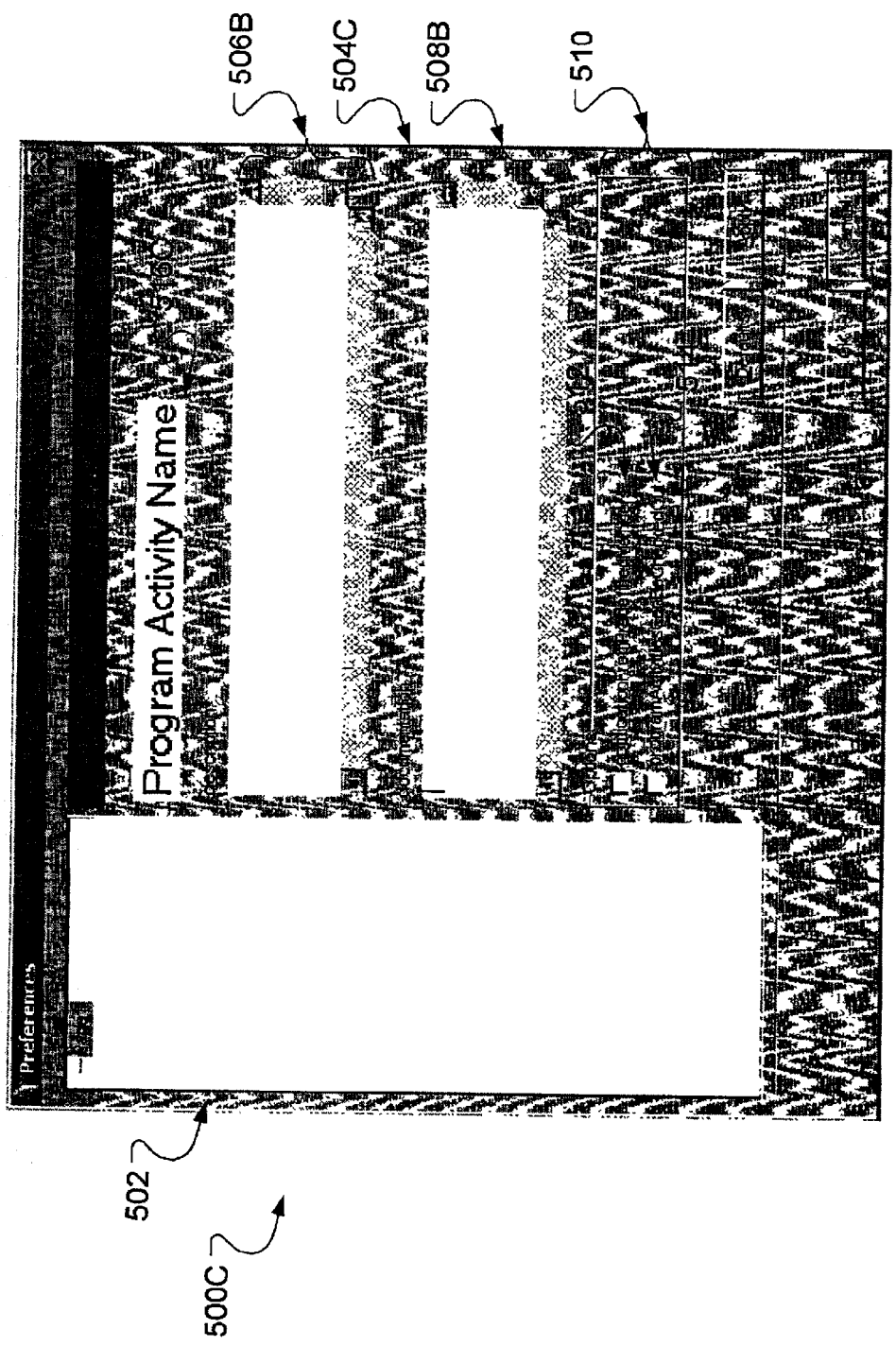
FIG. 9 illustrates a Properties dialog based on the object property layout in the Customize Properties dialog of FIG. 8.

A Preferences dialog 500C is illustrated in FIG. 9. Selected on a left preferences pane 502 is the group "Page1". While on a right preferences pane 504C is shown a user interface layout arranged according to the object property layout specified in the Customize Properties dialog 200C of FIG. 8. In the order specified in FIG. 8, the "program" text field 516C is shown at the top of the layout, with a representation as edited through use of the class called NameFormatter. Next, the "description" text area 506B is shown, followed vertically downward by the "documentation" text area 508B and the "Options" group box 510.

The NameFormatter class has the following exemplary constructor:

```
public NameFormatter(com.ibm.swt.widgets.Composite
    parent) {
super(parent);
name=new Text(parent,0);
com.ibm.swt.graphics.FontData    d=new
    com.ibm.swt.graphics.FontData( );
d.setHeight(18);
name.setFont((new com.ibm.swt.graphics.Font
    (Display.getDefault( ),d)) );
}
```

Figure 10:
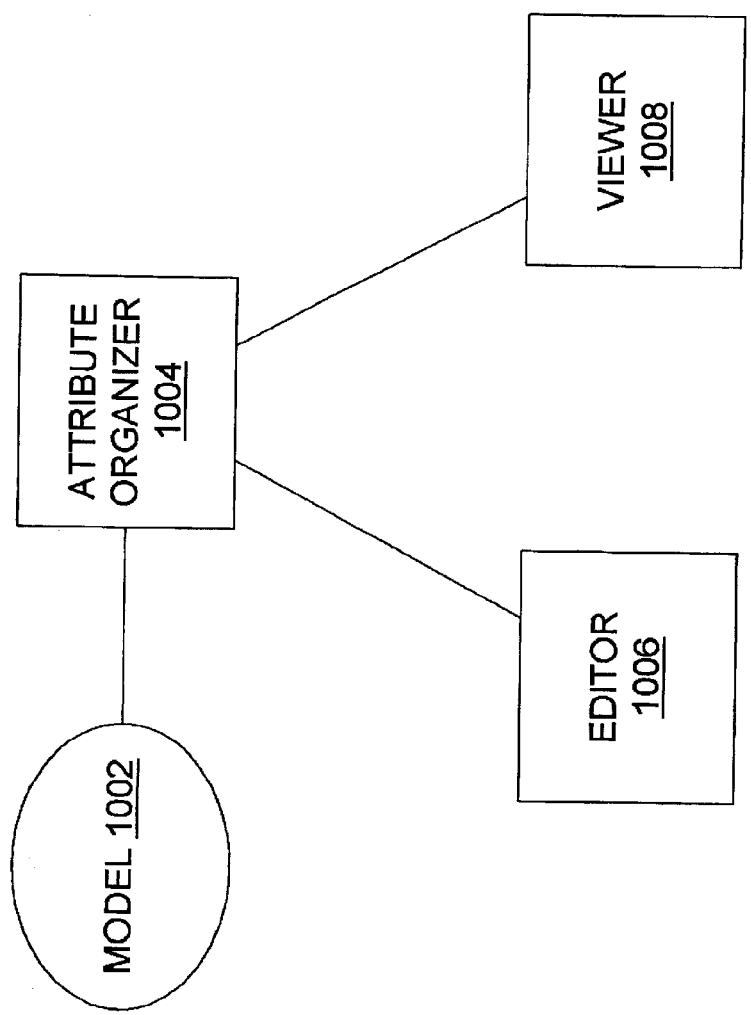
FIG. 10 illustrates a component diagram of an embodiment of the invention.

FIG. 10 illustrates the relationship between an Attribute Organizer object 1004, a Model 1002 where the properties of a Flow Type are stored, an Attribute Organizer object Editor 1006 and an Attribute Organizer object Viewer 1008. The Attribute Organizer object 1004 receives a set of unassigned properties from the Model 1002. Through interaction with a user, the Attribute Organizer object Editor 1006 determines which of the properties are to be shown and the details of the layout and representation of the properties. The Attribute Organizer object Viewer 1008 may display the properties as specified through use of the Attribute Organizer object Editor 1006. In view of the above, it should be clear that an exemplary representation of the Attribute Organizer object Editor 1006 is the Customize Properties dialog 200 of FIG. 2 and that an exemplary representation of the Attribute Organizer object Viewer 1008 is the Properties dialog 500A of FIG. 5. Another relation, which is not shown, is the interaction, at run time, between the Attribute Organizer object Viewer 1008 and the Model 1002, from which properties may be read and to which properties may be written.

Figure 12:
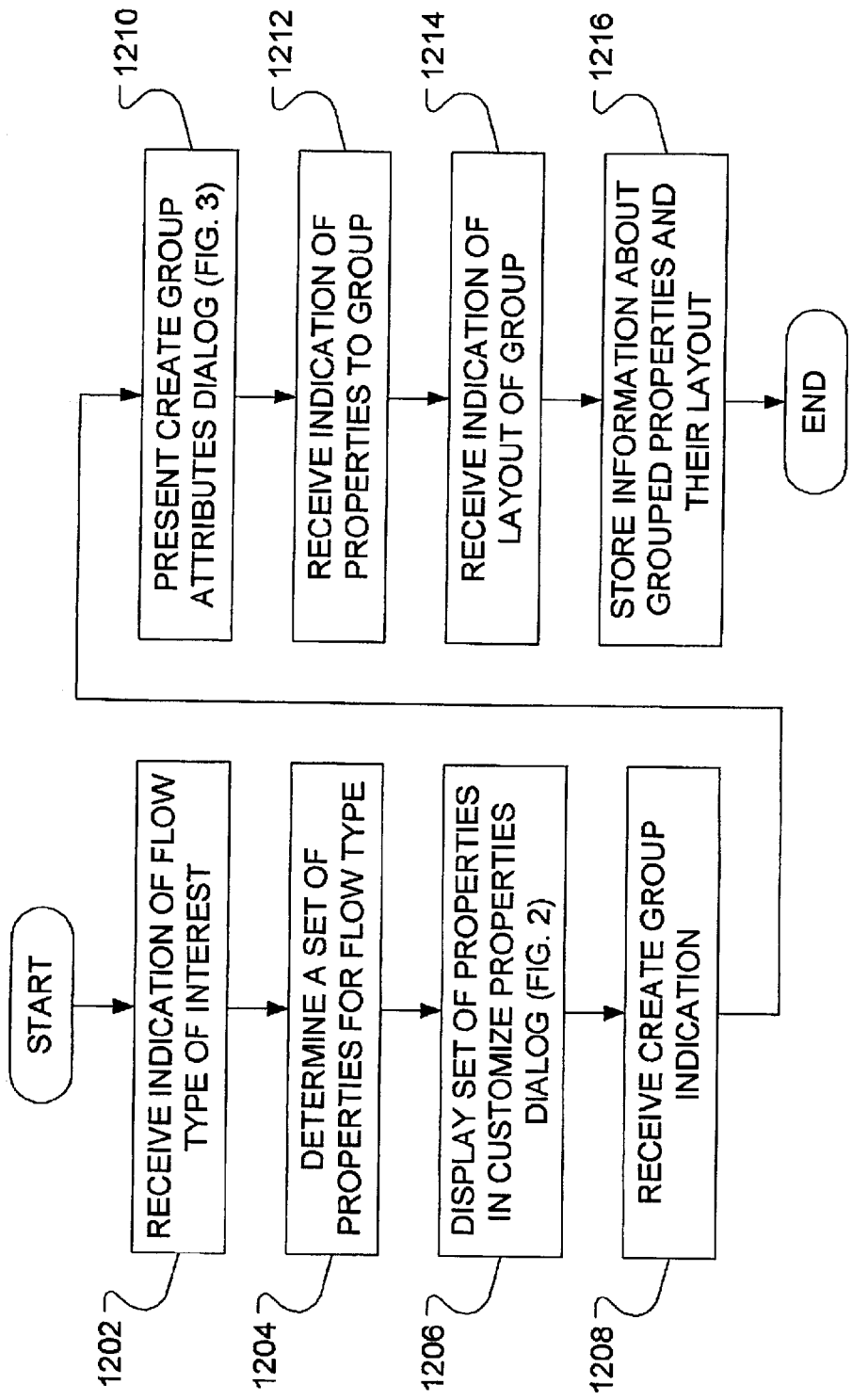
FIG. 12 illustrates steps of a layout customization method according to an embodiment of the present invention.

The steps followed by a process flow development tool in allowing a user to customize a layout for object properties is illustrated in FIG. 12. The tool initially receives an indication of a Flow Type of interest (step 1202) from the underlying tool platform. It is then necessary for the tool to determine a set of properties for the Flow Type (step 1204). Where the Flow Type is a Java class, the process flow development tool may communicate with the underlying tool platform using an API, for instance, a Meta Object Facility (MOF) API. As will be apparent to a person skilled in the art, for Java objects there exists reflective APIs that will provide a list of the properties of a specified class. Once the set of properties for a particular Flow Type (class) have been determined, a dialog may be opened to display to the user, say, on the display monitor 1110 of FIG. 11A, the set of properties in a dialog like the Customize Properties dialog 200 of FIG. 2 (step 1206). Using the Customize Properties dialog 200, the user may then indicate a desire to create a group, say, by selecting the "Create Group . . . " button 218 (FIG. 2). Responsive to receiving this group creation indication (step 1208), the tool may present a dialog like the Create Group Attributes dialog 300 of FIG. 3 (step 1210). It is through such a dialog that the tool may receive an indication which of properties to group (step 1212). Responsive to the Create Group Attributes dialog 300 being closed, say, though the selection of the "OK" button 312 (FIG. 3), an object property layout may be stored (step 1214) in an Attribute Organizer object associated with the particular Flow Type, including information about the properties grouped in step 1212. The association of an Attribute Organizer object with a Flow Type may be accomplished by specifying the Attribute Organizer object in a field of the Flow Type. Alternatively, the Attribute Organizer object can be stored and referenced by a plug-in file associated with the Flow Type.

As discussed above, the user of the tool will select a Flow Type and create an instance, i.e., an object, of the selected Flow Type on the canvas 1120 (FIG. 11B). If the user has already customized the property layout for the selected Flow Type, a new Attribute Organizer object (a copy of the Attribute Organizer object associated with the Flow Type) is associated with the Flow Type object. If the user has not customized the property layout for the selected Flow Type, the Flow Type object is created without an associated Attribute Organizer object.

Once a Flow Type object is on the canvas 1120, it is represented by a node 1122 (FIG. 11B). A user may wish to review the properties of the Flow Type object. This wish may be indicated, for example, by directing a cursor, through the use of the mouse 1114 (FIG. 11A), to a position over the node 1122. A right mouse click may act as a request to view a menu related to the node 1122. From the perspective of the tool and in view of FIG. 13, the tool receives the request from the user to present a menu in respect of the Flow Type object (step 1302). The tool then determines whether the Flow Type object has an associated Attribute Organizer object (step 1304). If the Flow Type object has an associated organizer object, the tool presents the node-specific menu including a "Properties" menu item (step 1306). The tool may then receive an indication from the user of a selection of the "Properties" menu item (1308) and, in response to receiving the indication, the tool may display a Properties dialog with a layout specified by the associated Attribute Organizer object (step 1310). In the case where the node 1122 does not have an associated Attribute Organizer object, the node-specific menu presented to the user does not include a "Properties" menu item (step 1312). Should the user select an action from this menu, the tool reacts accordingly (step 1314).

As will be apparent from the foregoing, after extraction of properties of a Flow Type (class), a property editor may be used to select properties and organize selected properties for display. This selection and organization is stored in an Attribute Organization object associated with the Flow Type (class). Then, when an object of the Flow Type is instantiated, properties of the instantiated Flow Type object will be displayed as dictated by the Attribute Organization object.

Advantageously, where the underlying tool platform supports the creation, at runtime, of compounds of objects, i.e., an object made up of several objects of different Flow Types, embodiments of the present invention maintain the ability to allow the customization of the layout of the properties of the compound object. This ability to work with compound objects is feasible because embodiments of the present invention can function with any object whose type is declared in an extension point in a plugin.xml file. The layout of those runtime created objects can be set via APIs which save a desired layout into an Attribute Organizer object with or without user input, dependent upon the manner in which the new (compound) object is created.

Another advantage of the present invention is an ability to change the property layout of a Flow Type object at runtime without having to rewrite the Properties dialog of the Flow Type. This can be achieved by updating the Attribute Organizer of the Flow Type to reflect a desired change in the property layout. Consequently, any instances of the Flow Type, which, naturally, have an association with the Attribute Organizer of the Flow Type, are affected by the change. Examples of changes to the property layout include property addition, property deletion, movement of properties from one page (group) to another and new page creation.

As will be apparent to a person skilled in the art, the structure of the Properties dialog need not necessarily be as illustrated herein. A departure from the left pane illustrated structure may include the well-known use of "tabs" protruding from the top of each page to identify the page and allow the selection of other pages.

Other modifications will be apparent to those skilled in the art and, therefore, the invention is defined in the claims.

We claim:

1. A method of providing, to a user, a capability to customize a display property layout for objects of a given type of object, said method comprising:

determining a set of properties of said given type of object, said given type of object representative of an event or a software component;

displaying said set of said properties in a user interface;

receiving an indication, from said user, of a grouping of particular ones of said set of said properties; and storing information describing said grouping in a property organizer object associated with said given type of object, said information existing as a serialized file in an extensible markup language.

2. The method of claim 1 further comprising:

receiving an indication, from said user, of a display layout for said grouping of particular ones of said set of said properties; and storing information describing said display layout in said property organizer object, said property organizer being physically stored along with said given type of object.

3. The method of claim 2 further comprising, before said determining:

receiving a further indication, from said user, of a desire to customize property layout for said given type of object, said given type of object existing as a node with at least one connection; and presenting a user interface associated with said node for receiving indications, from said user, of a preferred property layout.

4. The method of claim 3 further comprising:

receiving an indication, via said user interface, of a selection of a given property in said grouping of particular ones of said set of said properties; and receiving an indication to alter a vertical order of presentation of said given property relative properties in said grouping and not included in said selection.

5. The method of claim 1 further comprising:

receiving an indication, via said user interface, of a selection of a given property in said grouping of particular ones of said set of said properties;

receiving an indication, via said user interface, of a desire to delete said given property from said grouping; and removing said given property from said grouping.

6. The method of claim 1 further comprising, where said grouping of particular ones of said set of said properties is a first grouping:

receiving an indication, via said user interface, of a selection of a given property in said first grouping;

receiving an indication, via said user interface, of a desire to move said given property from said first grouping to a second grouping;

removing said given property from said first grouping; and adding said given property to said second grouping.

7. The method of claim 1 further comprising:

receiving an indication, via said user interface, of a selection of a given property in said grouping of particular ones of said set of said properties;

receiving an indication, via said user interface, of a desire to customize a size, spacing and indentation of said given property.

8. A computer system for process flow development comprising:

means for determining a set of properties for a type of object, said type of object representative of an event or a software component;

means for displaying said set of said properties in a user interface;

means for receiving an indication, from said user, of a grouping of particular ones of said set of said properties; and means for storing information describing said grouping in a property organizer object associated with said given object, said information existing as a serialized file in an extensible markup language.

9. A computer system for process flow development comprising:

a processor for determining a set of properties for a type of object, said type of object representative of an event or a software component;

a display, in communication with said processor, for displaying said set of said properties in a user interface;

an input peripheral, in communication with said processor, for receiving an indication, from said user, of a grouping of particular ones of said set of said properties; and a memory, in communication with said processor, for storing information describing said grouping in a property organizer object associated with said given object, said information existing as a serialized file in an extensible markup language.

10. A computer readable medium containing computer-executable instructions which, when performed by a computer system for process flow development, cause the processor to:

determine a set of properties of a type of object, said type of object representative of an event or a software component;

display said set of said properties in a user interface;

receive an indication, from said user, of a grouping of particular ones of said set of said properties; and store information describing said grouping in a property organizer object associated with said given object, said information existing as a serialized file in an extensible markup language.

* * * * *